Sept. 23, 1947.  O. DENYS  2,427,718
VACUUM DISTILLATION WITH CIRCULATION OF GAS
Filed Dec. 19, 1944  3 Sheets-Sheet 2
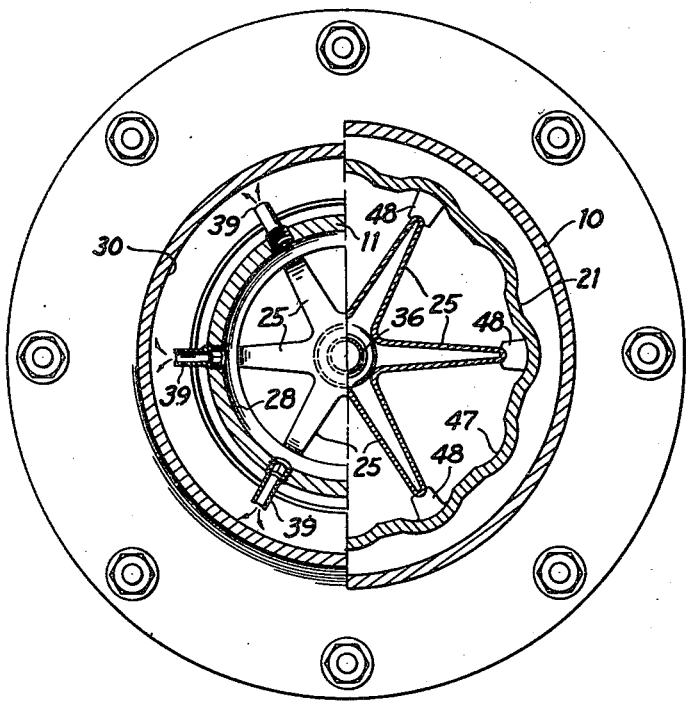
FIG.3.
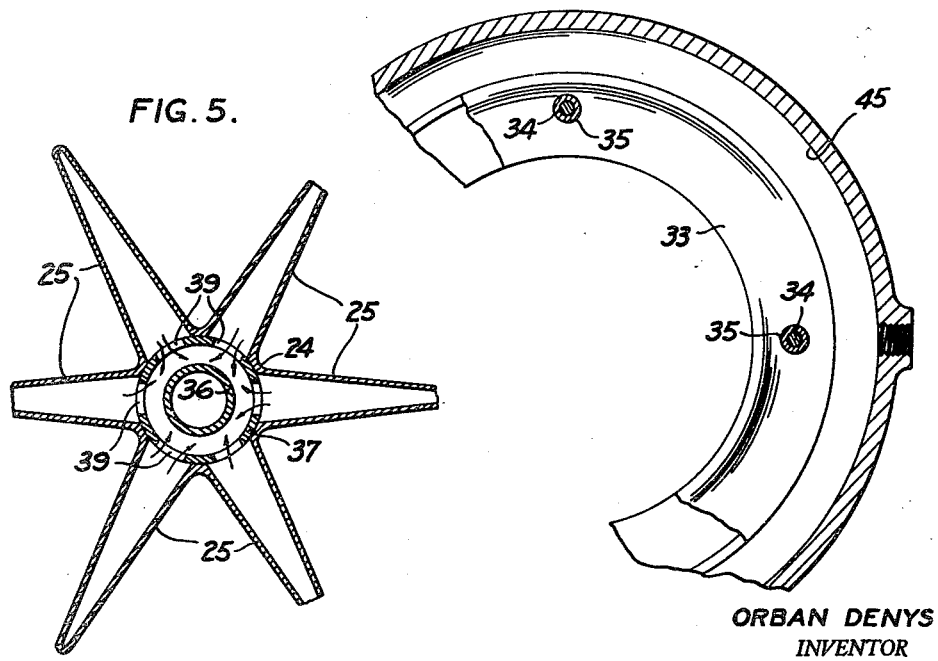
FIG.4.
FIG.5.
ORBAN DENYS
INVENTOR
BY
ATTORNEYS

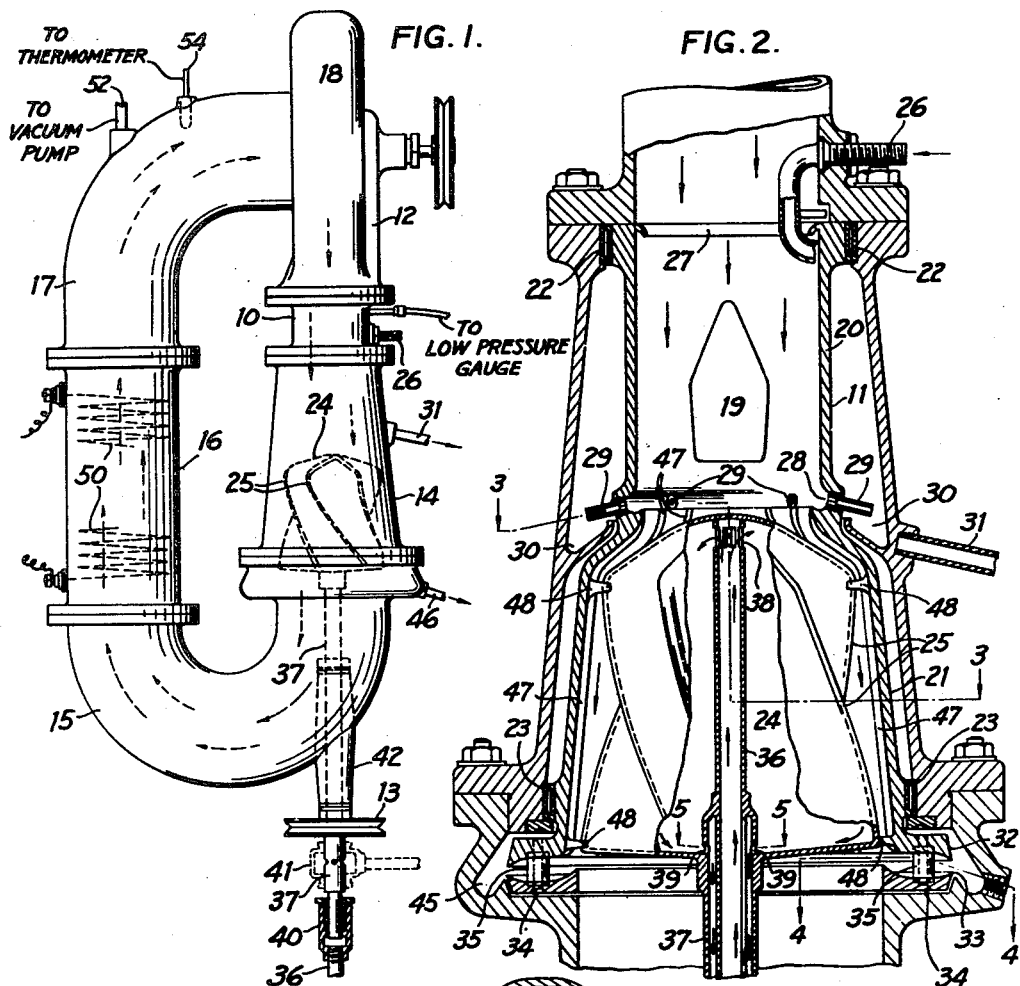
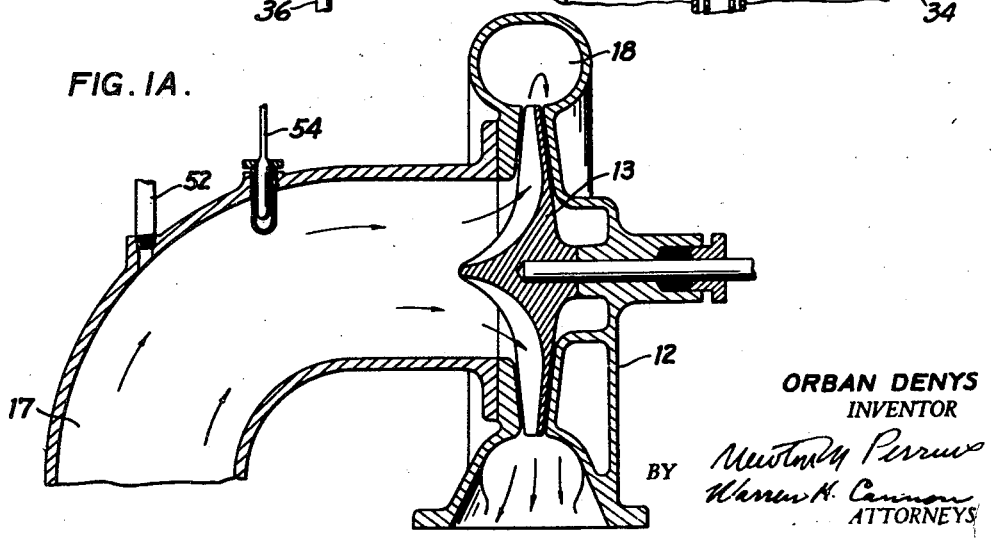

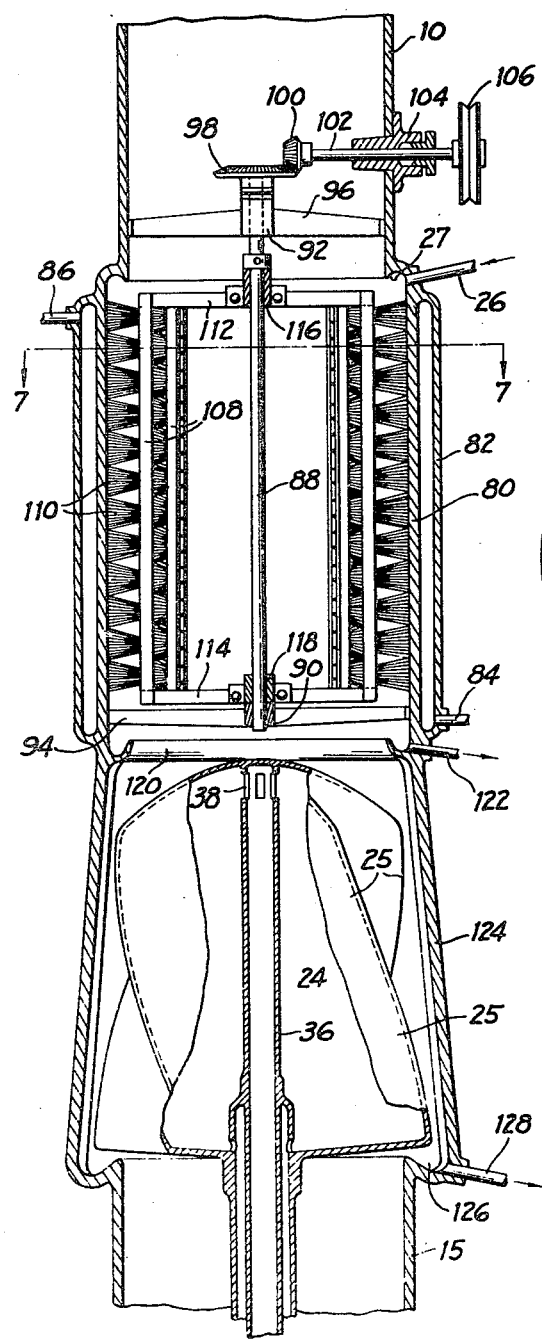
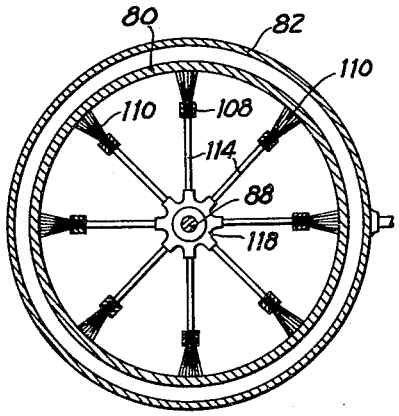
FIG. 6.
FIG. 7.

Patented Sept. 23, 1947

2,427,718

UNITED STATES PATENT OFFICE 2,427,718

VACUUM DISTILLATION WITH CIRCULATION OF GAS

Orban Denys, Brooklyn, N. Y., assignor to Distillation Products, Inc., Rochester, N. Y., a corporation of Delaware Application December 19, 1944, Serial No. 568,860

17 Claims. (Cl. 202—52)

This invention relates to an improved vacuum distillation process and apparatus.

It is an object of my invention to provide a vacuum distilling process and apparatus wherein a vacuum controlled high velocity stream or blast of noncondensable gas is utilized for vaporizing the distilland and/or transporting the vapors to the condenser.

Another object is the provision of a method and apparatus for vaporizing a distilland by heating the vaporization surface of said distilland by means of a high velocity blast of heated noncondensable gases which are circulating continuously in a closed, partially evacuated system.

A further object is a method and apparatus for maintaining a liquid sheet or film of a distilland around the inner surface of a cylindrical member in a closed, partially evacuated system whereby heated non-condensable gases may be passed through the cylindrical member and effect surface heating and evaporation of the distilland.

Still another object of the present invention is the provision of a vacuum distillation apparatus which is more efficiently operated than previously known vacuum distillation apparatus.

A further object is the provision of a vacuum distillation apparatus wherein a rotatable, approximately cylindrical distilling chamber is employed.

A further object is the provision of a vacuum distillation apparatus wherein a cylindrical, rotatable distilling chamber and a condenser are arranged in a closed system.

A further object is the provision of a method for vaporizing the exposed surface of a distilland by means of radiant heat emanating from a heating element and using the non-condensable gases originally present in the distilland as a vehicle to transport the resulting vapors to a condenser.

The distillation of organic substances subject to thermal decomposition has been made possible by employing reduced pressures, so that the organic substance is distilled at a temperature below that at which it would decompose. In a conventional apparatus a distilling chamber is connected to a condenser with receiver for the distillate, and vacuum pump, and during operation the difference in pressure between distilling chamber and condenser causes the vapors rising from the distilling substance to flow toward the condenser. However, when greatly reduced pressures are employed the small masses of vapors occupy enormous volumes so that the amount condensing through a given period is extremely small compared with distillations carried out at normal pressure. Increasing the rate of flow can be accomplished only by widening the difference in pressure, for example, employing a higher temperature in the vaporization step. But, as pointed out above, vacuum distillation is used when high temperatures are detrimental to the substance being distilled, and thus raising the temperature to increase the velocity of flow toward the condenser and hence yield, would defeat the principal object of vacuum distillation.

The prime difficulty encountered in the conventional vacuum distillation processes, namely the slow rate at which the distilling vapors can be condensed, has been mitigated to a great extent by the so-called high vacuum, unobstructed path or molecular distilling process. In this process the condenser instead of being a separate unit distinct from the distillation chamber, is disposed so that it is separated from the vaporizing surface by unobstructed space. When the distance between the distilland and condensing surface is less than the mean free path of the vapor molecules, the tendency will be for the bulk of these vapors to be condensed at their first jump from the vaporizing surface, if not interfered with by the non-condensable gases which are always present to some degree. Should the vapor molecule collide with a molecule of the non-condensable gas, it will be deflected from its path and probably back to the surface of the liquid, thus decreasing the rate of distillation so that for highest efficiency a minimum of such non-condensable gases should be present. However, the output of the vacuum pump which is employed primarily to exhaust these non-condensable gases from the system, is limited to a high degree by the area of the cross section of its tube connecting it to the distilling chamber, and it can only be increased to the detriment of the condenser area. Another deficiency of the ordinary molecular still is its inability to distill effectively substances whose vapor pressure corresponds to a molecular mean free path shorter than the existing distance between distilling surface and condenser.

These and other technical difficulties encountered in vacuum distillation in the past are overcome in the present invention, employing a new principle heretofore not used in vacuum distillation, particularly in the unobstructed path type.

In accordance with the present invention the non-condensable gases in a closed partially evacuated system are preferably heated to a temperature slightly above the vaporization temperature of the substance to be distilled and circulated at a relatively high velocity into contact with the film of distilland, the preferred velocity being about 300 meters a second, whereby said distilland is partially vaporized. The gases containing vapor molecules diffused therein are then cooled by contact with a condenser to strip them of the entrained vapors of the distilland, after which the operation is repeated. Not only do these gases vaporize the molecules at the surface, but carry the vapors entrained therein to the condensing chamber by reason of its directed high velocity flow. The principle employed is that of diffusion, that is, the vaporized molecules seep into the intermolecular spaces of the non-condensable gases, and because these heated gases are, in the preferred embodiment of my invention, flowing at a high rate of speed in a direction parallel to the surface of the distilland, there is little tendency for the vapor molecules to be deflected back to the surface of the liquid. Quite to the contrary, any collision with a non-condensable gas molecule tends to carry the vapor molecule away from the distilling surface towards the condenser. The property that gases have to diffuse into one another is known to those familiar with the art and is mentioned in practically all standard textbooks as Dalton's law of partial pressures. In my process I use the diffusion of rarefied gases in conjunction with a high velocity to prevent vapor molecules flying off a distilling surface to fly back to that surface and to enable them to reach a condenser, thus making possible a rate aof distillation very close to the maximum theoretical rate possible under a given set of circumstances. It should be borne in mind that the rate of diffusion of one gas into another is greatly increased under low pressures.

In the apparatus which I prefer to use for carrying out my process the distillation chamber is a cylindrical, rotating member which through centrifugal force maintains the coolest portion of the liquid near the walls, and the hot gases continually sweeping over the surface almost instantaneously vaporize the molecules in the outer surface. It will readily be seen that this manner of vaporization not only eliminates all the difficulties of external heating such as bumping and frothing, but accomplishes the vaporization much more rapidly for a fresh surface of molecules to be vaporized is always exposed.

Another advantage of my diffusion vacuum distilling process is that the extreme low pressures required heretofore in some vacuum systems are not necessary, thus eliminating extreme pumping.

A further advantage of the preferred embodiment, i. e., using a heated gas is that relatively high temperatures may be employed without danger of decomposition for the molecules at the surface of the liquid are exposed to the high temperature for only an extremely short period of time. In the conventional way of heating, the heat is applied to the exterior walls of the distilling chamber. There is always some heat lost in penetrating the wall and the thickness of the layer of liquid causing a heat gradient, that is, the hottest portion of the liquid will be close to the walls and the top portion or vaporization surface is the coolest. Therefore, if sufficient heat is applied to bring the upper layer to a point just below that at which it would decompose, a certain amount of decomposition has undoubtedly already taken place in the lower portion nearest the heat source. On the other hand, if heat insufficient to cause any decomposition is applied, slow and inefficient vaporization takes place at the surface. In the process of the present invention, however, the factors are just the reverse. It is the upper and vaporization layer which is the hottest, and relatively no heat penetrates completely through the distilling film of distilland. Therefore, in the vaporization stage only those molecules in the extreme outer layer are heated and as soon as they vaporize and are diffused a fresh layer is exposed. Since this change of the surface molecules from liquid to vapor can be regarded to all intents and purposes, as instantaneous, the temperature employed can actually be somewhat above the normal decomposition temperature, for it has been found that with many substances very short periods of heating above decomposition temperature have no appreciable effect.

Still a further advantage is that my apparatus by its design and mode of construction which eliminates the use of extreme vacuum pumps such as used in the molecular distilling process make it suitable for large scale construction and distillation operations.

My process is particularly well adapted for the distillation of organic substances which ordinarily cannot be distilled without thermal decomposition at pressures higher than 5–10 mms. and may be employed for either the distillation or fractionation of organic substances. For example, it can be utilized for the separation and purification of long chain hydrocarbons, alcohols, fatty acids, esters and glycerols; separation of polymerized and unpolymerized fractions of vegetable fats and oils; purification of amino acids, sterols and hormones; and production of vitamin concentrates.

In general, the distilling operation is carried out in my apparatus employing pressures in the order of from $\frac{1}{100}$ of a mm. to 1 mm. of mercury. For example, in utilizing my process and apparatus, a distilland is flowed continuously onto the inner surface of a vertically disposed, cylindrical, rotating distillation chamber where by centrifugal force a thin sheet of the liquid is kept against the inner wall of the chamber as it flows downwardly, it being understood that the entire system comprising the distilling chamber and condenser is evacuated to a pressure roughly ten times the partial vapor pressure of the distilling substance at operating temperature. While the liquid is flowing down the wall of the distilling chamber the distilland is vaporized by flowing through the cylinder a stream of heated non-condensable gases. This stream of non-condensable gases with the vapors diffused therein passes from the distilling chamber leaving behind only the non-distilled fraction. The heated gases with the vapors entrained therein upon leaving the distillation chamber come in contact with a condenser effecting condensation and permitting recovery thereof. The process is essentially a continuous one because the non-condensable gases and the distilland are both flowed continuously. The condensate may also be removed continuously if desired.

It is usually desirable, in carrying out the process, to determine experimentally or otherwise the pressure, temperature, and rate of speed at which the non-condensable gases are circulated, in order to obtain the most efficient results with the particular material desired to be distilled. In operation, the vacuum pump maintains the non-condensable gases at a constant pressure which is substantially higher than the vapor tension of the distilland. As mentioned heretofore in the specifications, the distilland will vaporize even if another gas or mixture of gases are present at a much higher pressure than its own vapor tension (Dalton's law of partial pressures), and the rate of distillation will be sensibly the same as if no other gases were present providing the vapor molecules are removed as quickly as they leave the liquid surface, which happens in my process due to the high velocity of the entraining noncondensable gases in which the vapor molecules diffuse.

The distilland should be preheated prior to treatment to about the distilling temperature, for optimum efficiency, and the bulk of the gases dissolved therein evacuated.

In the drawings wherein are shown certain preferred embodiments of the invention:

Figure 1 is a side elevation of my apparatus;

Figure 1A is an enlarged detail of the fan structure 12 of Figure 1.

Figure 2 is a vertical sectional view illustrating the vaporizing and condensing operation of the apparatus;

Figure 3 is a transverse sectional view taken along the line 3—3 of Fig. 2 looking in the direction of the arrows;

Figure 4 is a similar view taken on the line 4—4 of Fig. 2;

Figure 5 is a detail section taken through the lower portion of the condenser indicated by the line 5—5 of Fig. 2.

Figure 6 is an enlarged vertical section of a modified vaporizing and condensing unit the remainder of the apparatus being the same as shown in Figure 1 and;

Figure 7 is a horizontal section taken on line 7—7 of Fig. 6.

Referring to Figures 1-5, a relatively stationary jacket is indicated generally by 10, a rotatably mounted vaporizing or distilling chamber portion 11, a blower or pump 12, and driving means 13 for imparting rotation to the distilling member.

The jacket 10, as is clearly shown in the several views of the accompanying drawings, is produced by joining together a plurality of conduits or tubular members so that a closed chamber will be formed. As shown in Figs. 1 and 2, the frustro-conical, vertically extending section 14 has secured to the lower end thereof a return bend portion 15, which in turn supports the vertical, cylindrical section 16 and an elbow 17. The elbow, it will be noted by referring to Fig. 1, is connected directly to the pump housing 18, whereby a closed circuit is effectually maintained. Referring now particularly to Fig. 2, it will be noted that the vaporizing or distilling chamber 11 consists of a cylindrical portion 20 at its upper end, and has a somewhat enlarged and downwardly flared portion 21 at its lower end. This distilling chamber it will be noted, is mounted to freely rotate within the stationary jacket by means of the upper and lower needle or roller bearings 22 and 23. The distilling chamber 11 may have located therein a quartz heating element 19, positioned in such a manner that the circulating non-condensable gases are heated and at the same time the surface of the distilland is heated by radiation to vaporization temperature.

The condenser 24 is a star-shaped assembly constructed of a plurality of hollow fins 25, and is secured within the lower flared portion 21 of the vaporizing chamber 11 for a purpose to be hereinafter described.

A feed pipe 26 is located in the upper end of the jacket 10 slightly above the vaporization chamber, and is bent downwardly so that the distilland may be introduced near the upper end of the chamber. In order to avoid as much as possible any turbulence in the flow of gases rushing through the distilling chamber, I have provided an inwardly extending annular flange 27 at the upper extremity of the distilling chamber. This flange is so shaped as to favor the proper expansion of the non-condensable gases whose pressure may have been built up somewhat by the action of the blower. It also serves to prevent the distilland from flowing upwardly from the distilling chamber and at the same time it also is a means for keeping the stream of non-condensable gases away from the distilland's surface by controlling the divergence of the stream merely by adapting the conditions of flow to that particular purpose.

An annular trough 28 is formed in the distilling chamber and is located at the lower portion of its cylindrical section 20, as is clearly shown in Fig. 2. A plurality of outwardly extending nozzles 29 are removably mounted within the annular trough 28 for the purpose of drawing the heavier portions of the distilland from the annular trough 28 into the annular stationary trough 30. This annular trough 30, it will be noted, is in direct communication with the pipe 31 for directing that portion of the distilland for either further treatment, storage, or as desired.

The lowermost portion of the flared section 21 is provided with an outwardly extending and integrally formed flange 32. A ring or flange 33 is carried by the flange 32, and is secured thereto by means of a plurality of screws and spacing bushings 34 and 35, as clearly indicated in Figs. 2 and 4.

The vaporizing or distilling assembly, together with the hollow condenser 24 and the flange 33, it will be noted, rotate as a single unit, and the rotative movement for this assembly is imparted by means of the pair of concentric tubular shafts 36 and 37.

The inner tubular shaft 36 is provided near its upper end with a plurality of slits or openings 38 whereas the upper end of the outer shaft 37 is provided with openings 39. These slits and openings 38 and 39, it will be noted, permit the circulation of the cooling liquid for the hollow-finned condenser 24.

Packing boxes 40 and 41 may be employed at the lower ends of the concentric shafts for permitting the passage of the cooling liquid into and away from the shafts during the operation of the apparatus. The outer shaft 37 is provided with a drive pulley 43, and is mounted to freely rotate within the bearing extension 42.

Referring especially to Figs. 2 and 4, it will be noted that the upper surface of the ring 33 is concave, and that the outer edge is slightly lower than the inner diameter. This novel construction permits the accumulated condensate to be thrown in an outward direction, or into the annular well or recess 45 and outwardly through the pipe 46.

I have found that the fins 25 of the condenser 24, by being spirally formed present greater surface area for condensation and at the same time serve to more effectually throw off the condensate. Then, too, by fluting the flared wall 21 as indicated at 47, a greater area is presented to this surface, and the distillate is more readily directed downwardly toward the annular well 45. Although the finned condenser is shown as connected to the lower portion 21 of the vaporization chamber 11 by means of the spaced lugs 48, it will be appreciated that the connection may be made in various other ways.

Connection 52 is provided near the upper end of the elbow 17 for a vacuum pump and a well is provided for thermometer 54. The purpose of the vacuum pump is to maintain a uniformly low pressure within the system.

Fan 12 can be any fan of the centrifugal type or of the axial flow type, with impellers or blowers 13 which have a tensile strength sufficient to withstand the centrifugal force created by a blade tip velocity of above 300 meters per second. In its design only the radial stress has to be considered for on account of the very low density of the gases that the fan has to move the axial thrust is very small even at the high velocity used. A typical design for the blades of a centrifugal fan suitable for my apparatus is common in aviation superchargers and is called the constant strength type. Constructional details of one such fan are given in "Proceedings of the Institution of Mechanical Engineers," June 1922, page 795 et seq. With a fan diameter of 25 cm. the speed may, for example, be 25,000 to 30,000 R. P. M. to give a peripheral velocity of 300 meters per second. The nozzle at the outlet of the pump may, with advantage, be of the convergent-divergent type for higher air speeds. If it is desired to forego the advantages of a high blade tip velocity and still give to the circulating gas the required velocity recourse can be made to the centrifugal multistage blower which is well known to the man familiar with the art.

An electrical heating unit 50 is diagrammatically indicated within the vertically connecting pipe 16 of the closed chamber for the purpose of effectively reheating the circulating medium. If desired the electrical unit or other suitable heating means may be located outside the pipe 16 and the circulating medium heated thereby.

Referring to Figs. 6 and 7, numerals 10 and 15 designate the upper and lower conduits which are connected to the circulating system, which is identical to that shown in Figs. 1, 2 and 5, the modification of the apparatus consisting entirely in the changes shown in the vaporizing and condensing units. Numeral 80 designates a cylindrical vaporizing surface provided with an external jacket 82 through which heating fluid is circulated by introduction through conduit 84 and removal through conduit 86. Numeral 88 designates a shaft, rigidly held in the position shown, by bearings 90 and 92, positioned in and integral with spider supports 94 and 96. The upper end of shaft 88 is provided with gear 98, which meshes with gear 100 on driveshaft 102, which is rigidly held in place by packed bearing 104 and driven by pulley 106.

Numeral 108 designates a plurality of elongated wire brushes provided with bristles 110. These brushes are mounted at the ends of a plurality of spokes 112 and 114 and are so positioned that the ends of the bristles 110 contact with the inside surface of cylinder 80. Spokes 112 and 114 are mounted in hubs 116 and 118 respectively, which are, in turn, carried and rotated by shaft 88. Numeral 120 designates a gutter for collecting undistilled residue and numeral 122 a conduit for removing liquid from said gutter 120. Numeral 124 designates a stationary cylindrical casing which surrounds rotatable cooling element 25 and numeral 126 designates a gutter which is at the base thereof, to which is connected a withdrawal conduit 128.

In the operation of the apparatus of Figs. 1–5 the entire apparatus is evacuated to the desired pressure by means of a vacuum pump (not shown) connected to conduit 52. The electrical heating unit 50 is adjusted to the proper temperature, and the driving means 13, for rotating the vaporizing and distilling chamber 11 is set in motion. A cooling liquid is flowed into the rotating condenser fins 25, and after the blower fan 12 has been started, the apparatus is ready for operation. The liquid distilland is flowed through the feed inlet 26 onto the upper end of the inner surface of the cylindrical distilling chamber 20 whereby the rotation of the cylindrical distilling chamber causes a thin sheet of the distilland to be disposed about the inner surface thereof. The pre-heated, non-condensable gases, by the action of the blower fan 12, are passed in a stream at a high velocity through the distilling chamber and come in contact with the outer surface of the distilland causing vaporization thereof, and as this stream of heated non-condensable gases passes from the distilling chamber 20 it has entrained therein and carries the vapors of the distilland to the condenser 24 where they come in contact with the cold rotating fins 25. These entrained vapors are thus condensed and collected in the annular trough 45 as a condensate. Any unvaporized distilland collects in the annular trough 30 at the lower end of the distilling chamber 20. It is readily seen that the operation is essentially a continuous one, that is, the non-condensable gases are continuously circulated by the blower fan 12, that the distilland may continuously be fed into the rotating distilling chamber 11 and that the non-condensable gases having the vapors entrained therein are cooled to cause condensation of the vapors and that the non-condensable gases are then re-heated and the cycle repeated.

In operating the apparatus shown in Figs. 6 and 7 gas, which may or may not be heated, is circulated through 10 as described in connection with Figs. 1, 2 and 5. Brushes 108 are caused to rotate and liquid to be distilled is introduced through conduit 26. This liquid is spread in a very thin film on the inside surface of cylinder 80 by the rotation of brushes 108. Cylinder 80 is also heated by circulation of heating fluid through conduit 84 and removable through conduit 86. The vapors formed by the film of distilland on surface 80 are carried by the circulating gases into contact with condensing surface 25, as previously described. The condensate is thrown against the inside wall of 124, flows by gravity into gutter 126 and is removed from the system by way of conduit 128. If desired a stream-lined element shaped about like 19 of Fig. 1 may be placed centrally in 80 in order to direct the flow of gases toward the wall 80.

Instead of using such non-condensable gases which are present in the system under partial pressure and those liberated from the distilland, a mixture of those gases and hydrogen may advantageously be employed, the ratio of hydrogen to other non-condensable gases being kept constant by regulating both the hydrogen inlet and through pumping. The advantage of the use of hydrogen is its great heat conductivity and the high specific heat even when present only to 50% of the total volume of all gases present.

The diathermanous properties of non-condensable gases encountered with the average distilland are such as to warrant the use of radiant heat to vaporize the distilland. The heat rays will penetrate the stream of non-condensable gases without affecting them appreciably. Many distillands are also suitable to be vaporized by radiation, their adsorptive or diathermanous properties being sufficient to warrant such a heating method. Furthermore, their adsorptivity can be greatly increased, if need be, by dispersing in the distilland a substance of high adsorptivity, like amorphous carbon, for instance. I, therefore, do not wish to restrict my invention to the use of heated non-condensable gases for vaporizing the distilland. As pointed out, I can use instead the radiant heat of a heating element situated inside the distilling chamber to heat the distilling film of distilland. Preferably this heating element is shielded by a material such as quartz which is permeable to a great extent to heat rays and thus protects the vapor molecules from overheating whenever they impinge on it. Also, I may heat externally as shown in the modification of Figs. 6 and 7 or may use any of these modifications with heating of the circulating gas. When heated air is not used to vaporize the distilland it is advantageous to direct the exhaust side or nozzle of the fan so that the air current does not substantially contact with the film of distilland.

It is, of course, understood that several of my units may be used in series thus making fractionating of a distilland a continuous process.

The term "non-condensable gas" wherever employed in the specification and claims refers to a gas or mixture of gases which do not condense at the pressure and temperature employed.

It is to be understood that the above description of my invention is given by way of illustration only and that the process and apparatus may be modified to a considerable extent and still come within the scope of this invention.

This application is a continuation in part of my application #419,777, filed November 19, 1941.

What I claim is:

1. A high vacuum distillation process comprising circulating and recirculating at high velocity non-condensable gases through a closed circuit maintained under a high vacuum, centrifugally maintaining a sheet of distilland in a rotary longitudinally extended thin annular sheet at one point in said closed circuit, passing said non-condensable gases axially through said annular sheet of distilland for entraining the vapors from said distilland, condensing said vapors from said gases as they leave said annular sheet to produce the distillate, and evacuating surplus non-condensable gases given off by said distilland for maintaining a constant vacuum in said closed circuit.

2. A high vacuum distillation process, comprising circulating and recirculating at high velocity non-condensable gases through a closed circuit maintained under a high vacuum, centrifugally maintaining a sheet of distilland in a rotary longitudinally extended thin annular sheet at one point in said closed circuit, heating and passing said non-condensable gases axially through said annular sheet of distilland for entraining the vapors from said distilland, condensing said vapors from said gases as they leave said annular sheet to produce the distillate, and evacuating surplus non-condensable gases given off by said distilland for maintaining a constant vacuum in said closed circuit.

3. A high vacuum distillation process, comprising circulating and recirculating at high velocity non-condensable gases through a closed circuit maintained under a high vacuum, centrifugally maintaining a sheet of distilland in a rotary longitudinally extended thin annular sheet at one point in said closed circuit, passing said non-condensable gases axially through said annular sheet of distilland for entraining the vapors from said distilland, condensing said vapors from said gases as they leave said annular sheet to produce the distillate, evacuating surplus non-condensable gases given off by said distilland for maintaining a constant vacuum in said closed circuit, and draining away undistilled fractions of said distilland from the base of said annular sheet of distilland.

4. A vacuum distillation process, comprising circulating and recirculating at high velocity non-condensable gases through a closed circuit maintained under a high vacuum, centrifugally maintaining a sheet of distilland in a rotary longitudinally extended thin annular sheet at one point in said closed circuit, passing said non-condensable gases axially through said annular sheet of distilland for entraining the vapors from said distilland, cooling said gases as they leave said annular sheet and condensing said vapors from said gases and centrifugally forming a rotary longitudinally extended thin annular shaped sheet of said distillate axially disposed in relation to said annular sheet of distilland and passing said cooled gases axially through said thin annular sheet of distillate, and evacuating surplus non-condensable gases given off by said distilland for maintaining a constant vacuum in said closed circuit.

5. A vacuum distillation process, comprises circulating and recirculating at high velocity non-condensable gases through a closed circuit maintained under a high vacuum, centrifugally maintaining a sheet of distilland in a rotary longitudinally extended thin annular sheet at one point in said closed circuit, heating and passing said non-condensable gases axially through said annular sheet of distilland for entraining the vapors from said distilland, cooling said gases as they leave said annular sheet and condensing said vapors from said gases and centrifugally forming a rotary longitudinally extended thin annularly shaped sheet of said distillate axially disposed in relation to said annular sheet of distilland and passing said cooled gases axially through said thin annular sheet of distillate, and evacuating surplus non-condensable gases given off by said distilland for maintaining a constant vacuum in said closed circuit.

6. A vacuum distillation process, comprising circulating and recirculating at high velocity non-condensable gases through a closed circuit maintained under a high vacuum, centrifugally maintaining a sheet of distilland in a rotary longitudinally extended thin annular sheet at one point in said closed circuit, passing said non-condensable gases axially through said annular sheet of distilland for entraining the vapors from said distilland, cooling said gases as they leave said annular sheet and condensing said vapors from said gases and centrifugally forming a rotary longitudinally extended thin annular shaped sheet of said distillate axially disposed in relation to said annular sheet of distilland and passing said cooled gases axially through said thin annular sheet of distillate, evacuating surplus non-condensable gases given off by said distilland for maintaining a constant vacuum in said closed circuit, and draining away undistilled fractions of said distilland from the base of said annular sheet of distilland.

7. A vacuum distillation process, comprising circulating and recirculating at high velocity non-condensable gases through a closed circuit maintained under a high vacuum, centrifugally maintaining a sheet of distilland in a rotary longitudinally extended thin annular sheet at one point in said closed circuit, passing said non-condensable gases axially through said annular sheet of distilland for entraining the vapors from said distilland, cooling said gases as they leave said annular sheet and condensing said vapors from said gases and centrifugally forming a rotary longitudinally extended thin annular shaped sheet of said distillate axially disposed in relation to said annular sheet of distilland and passing said cooled gases axially through said thin annular sheet of distillate, and evacuating surplus non-condensable gases given off by said distilland for maintaining a constant vacuum in said closed circuit, and draining away the distillate from the base of said thin annularly shaped sheet of distillate.

8. Vacuum distillation apparatus, comprising a closed circulatory system, means for maintaining said system under high vacuum, means for circulating and recirculating non-condensable gases through said system at high velocity, means for centrifugally maintaining a sheet of distilland in a rotary longitudinally extended thin annular sheet at one point in said system for said non-condensable gases to pass axially through said annular sheet of distilland to entrain the vapors from said distilland, means for supplying heat for facilitating evaporating the distilland from said annular sheet and entraining the vapors in said gases, means for condensing said vapors from said gases as they leave said annular sheet to produce the distillate, means for evacuating surplus non-condensable gases given off by said distilland for maintaining a constant vacuum in said closed system, and means for centrifugally forming a rotary longitudinally extended thin annularly shaped sheet of said distillate at the point in said system where the distillate is formed for the non-condensable gases to pass axially through said annular sheet of distillate.

9. Vacuum distillation apparatus, comprising a closed circulatory system, means for maintaining said system under high vacuum, means for circulating and recirculating non-condensable gases through said system at high velocity, means for centrifugally maintaining a sheet of distilland in a rotary longitudinally extended thin annular sheet at one point in said system for said non-condensable gases to pass axially through said annular sheet of distilland to entrain the vapors from said distilland, means for supplying heat for facilitating evaporating the distilland from said annular sheet and entraining the vapors in said gases, means for condensing said vapors from said gases as they leave said annular sheet to produce the distillate, means for evacuating surplus non-condensable gases given off by said distilland for maintaining a constant vacuum in said closed system, and means for centrifugally forming a rotary longitudinally extended thin annularly shaped sheet of said distillate at the point in said system where the distillate is formed for the non-condensable gases to pass axially through said annular sheet of distillate, and means for draining away the distillate from the base of said thin annularly shaped sheet of distillate.

10. Vacuum distillation apparatus, comprising a closed circulatory system, means for maintaining said system under high vacuum, means for circulating and means for recirculating non-condensable gases through said system at high velocity, a tubular member rotatively axially mounted at one point in said system for said non-condensable gases to pass through and having a cylindrical top portion and an outwardly flared bottom portion, means for rotating said tubular member at a speed sufficient to centrifugally maintain a sheet of distilland in a rotary longitudinally extended thin annular sheet about the inner face of said cylindrical top portion, means for supplying distilland to said cylindrical top portion to be formed into said annular sheet, means for supplying heat for facilitating evaporating the distilland from said annular sheet and entraining the vapors in said gases, means for condensing said vapors from said gases as they pass through said outwardly flared bottom portion of said tubular member, means for centrifugally throwing said condensate upon the interior face of said outwardly flared bottom portion of said tubular member forming a rotary longitudinally extended thin annular-like sheet of said condensate through which the non-condensable gases pass, and means for evacuating surplus non-condensable gases given off by said distilland for maintaining a constant vacuum in said system.

11. Vacuum distillation apparatus, comprising a closed circulatory system, means for maintaining said system under high vacuum, means for circulating and means for recirculating non-condensable gases through said system at high velocity, a tubular member rotatively axially mounted at one point in said system for said non-condensable gases to pass through and having a cylindrical top portion and an outwardly flared bottom portion, means for rotating said tubular member at a speed sufficient to centrifugally maintain a sheet of distilland in a rotary longitudinally extended thin annular sheet about the inner face of said cylindrical top portion, means for supplying distilland to said cylindrical top portion to be formed into said annular sheet, means for supplying heat for facilitating evaporating the distilland from said annular sheet and entraining the vapors in said gases, means for condensing said vapors from said gases as they pass through said outwardly flared bottom portion of said tubular member, means for centrifugally throwing said condensate upon the interior face of said outwardly flared bottom portion of said tubular member forming a rotary longitudinally extended thin annular-like sheet of said condensate through which the non-condensable gases pass, and means for evacuating surplus non-condensable gases given off by said distilland for maintaining a constant vacuum in said system, said outwardly flared bottom portion having longitudinally extended fluted portions on its inner face for channelling the condensate towards the base of said outwardly flared bottom portion.

12. Vacuum distillation apparatus, comprising a closed circulatory system, means for maintaining said system under high vacuum, means for circulating and means for recirculating non-condensable gases through said system at high velocity, a tubular member rotatively axially mounted at one point in said system for said non-condensable gases to pass through and having a cylindrical top portion and an outwardly flared bottom portion, means for rotating said tubular member at a speed sufficient to centrifugally maintain a sheet of distilland in a rotary longitudinally extended thin annular sheet about the inner face of said cylindrical top portion, means for supplying distilland to said cylindrical top portion to be formed into said annular sheet, means for supplying heat for facilitating evaporating the distilland from said annular sheet and entraining the vapors in said gases, means for condensing said vapors from said gases as they pass through said outwardly flared bottom portion of said tubular member, means for centrifugally throwing said condensate upon the interior face of said outwardly flared bottom portion of said tubular member forming a rotary longitudinally extended thin annular-like sheet of said condensate through which the non-condensable gases pass, and means for evacuating surplus non-condensable gases given off by said distilland for maintaining a constant vacuum in said system, said tubular member being formed with an annular trough at the base of said cylindrical top portion for catching undistilled fractions of said distilland, and means for draining said trough.

13. Vacuum distillation apparatus, comprising a closed circulatory system, means for maintaining said system under high vacuum, means for circulating and means for recirculating non-condensable gases through said system at high velocity, a tubular member rotatively axially mounted at one point in said system for said non-condensable gases to pass through and having a cylindrical top portion and an outwardly flared bottom portion, means for rotating said tubular member at a speed sufficient to centrifugally maintain a sheet of distilland in a rotary longitudinally extended thin annular sheet about the inner face of said cylindrical top portion, means for supplying distilland to said cylindrical top portion to be formed into said annular sheet, means for supplying heat for facilitating evaporating the distilland from said annular sheet and entraining the vapors in said gases, means for condensing said vapors from said gases as they pass through said outwardly flared bottom portion of said tubular member, means for centrifugally throwing said condensate upon the interior face of said outwardly flared bottom portion of said tubular member forming a rotary longitudinally extended thin annular-like sheet of said condensate through which the non-condensable gases pass, and means for evacuating surplus non-condensable gases given off by said distilland for maintaining a constant vacuum in said system, and means for draining the distillate from the base of said outwardly flared bottom portion.

14. Vacuum distillation apparatus, comprising a closed circulatory system, means for maintaining said system under high vacuum, means for circulating and means for recirculating non-condensable gases through said system at high velocity, a tubular member rotatively axially mounted at one point in said system for said non-condensable gases to pass through and having a cylindrical top portion and an outwardly flared bottom portion, means for rotating said tubular member at a speed sufficient to centrifugally maintain a sheet of distilland in a rotary longitudinally extended thin annular sheet about the inner face of said cylindrical top portion, means for supplying distilland to said cylindrical top portion to be formed into said annular sheet, means for supplying heat for facilitating evaporating the distilland from said annular sheet and entraining the vapors in said gases, means for condensing said vapors from said gases as they pass through said outwardly flared bottom portion of said tubular member, means for centrifugally throwing said condensate upon the interior face of said outwardly flared bottom portion of said tubular member forming a rotary longitudinally extended thin annular-like sheet of said condensate through which the non-condensable gases pass, and means for evacuating surplus non-condensable gases given off by said distilland for maintaining a constant vacuum in said system, said last named means including an impeller fixedly connected with said tubular member.

15. A high-vacuum distillation process comprising circulating and recirculating at high velocity non-condensable gases through a closed circuit maintained under a high vacuum, maintaining a layer of distilland in a longitudinally extended thin sheet at one point in said closed circuit, passing said non-condensable gases longitudinally parallel to said sheet of distilland for entraining the vapors from said distilland, condensing said vapors from said gases upon a condensing surface which is located immediately beyond the vaporizing surface, and evacuating surplus non-condensable gases given off by said distilland for maintaining a constant vacuum in said closed circuit.

16. A high-vacuum distillation process comprising circulating and recirculating at high velocity heated non-condensable gases through a closed circuit maintained under a high vacuum, maintaining a layer of distilland in a longitudinally extended thin sheet at one point in said closed circuit, passing said heated non-condensable gases longitudinally parallel to said sheet of distilland for entraining the vapors from said distilland, condensing said vapors from said gases upon a condensing surface which is located immediately beyond the vaporizing surface, and evacuating surplus non-condensable gases given off by said distilland for maintaining a constant vacuum in said closed circuit.

17. A high-vacuum distillation process comprising circulating and recirculating at high velocity non-condensable gases through a closed circuit maintained under a pressure of less than 1 mm., maintaining a layer of distilland in a longitudinally extended thin sheet at one point in said closed circuit, passing said non-condensable gases longitudinally parallel to said sheet of distilland for entraining the vapors from said distilland, condensing said vapors from said gases upon a condensing surface which is located immediately beyond the vaporizing surface, and evacuating surplus non-condensable gases given off by said distilland for maintaining a pressure of less than 1 mm. is said closed circuit.

ORBAN DENYS.

REFERENCES CITED

The following references are of record in the file of this patent:

UNITED STATES PATENTS

| Number | Name | Date |
|---|---|---|
| 2,018,049 | Allen | Oct. 22, 1935 |
| 1,493,757 | La Bour | May 13, 1924 |
| 2,224,621 | Voorhees | Dec. 10, 1940 |
| 1,881,041 | Benjamin | Oct. 4, 1932 |
| 1,493,756 | La Bour | May 13, 1924 |
| 1,289,150 | Gathmann | Dec. 31, 1918 |